(12) United States Patent
Fullerton et al.

(10) Patent No.: US 8,279,031 B2
(45) Date of Patent: Oct. 2, 2012

(54) MULTI-LEVEL MAGNETIC SYSTEM FOR ISOLATION OF VIBRATION

(75) Inventors: Larry W. Fullerton, New Hope, AL (US); Mark D. Roberts, Huntsville, AL (US)

(73) Assignee: Correlated Magnetics Research, LLC, New Hope, AL (US)

( * ) Notice: Subject to any disclaimer, the term of this patent is extended or adjusted under 35 U.S.C. 154(b) by 0 days.

(21) Appl. No.: 13/355,011

(22) Filed: Jan. 20, 2012

(65) Prior Publication Data

US 2012/0188037 A1 Jul. 26, 2012

Related U.S. Application Data

(60) Provisional application No. 61/461,570, filed on Jan. 20, 2011.

(51) Int. Cl.
*H01F 7/02* (2006.01)
*F16F 13/00* (2006.01)
(52) U.S. Cl. .................. 335/285; 335/306; 267/140.15
(58) Field of Classification Search .................. 335/285, 335/306; 267/140.14–140.15; 310/90.5
See application file for complete search history.

(56) References Cited

U.S. PATENT DOCUMENTS

| | | | |
|---|---|---|---|
| 381,968 A | 5/1888 | Tesla |
| 493,858 A | 3/1893 | Edison |
| 996,933 A | 7/1911 | Lindquist |
| 1,236,234 A | 8/1917 | Troje |
| 2,389,298 A | 11/1945 | Ellis |
| 2,438,231 A | 3/1948 | Shultz |
| 2,471,634 A | 5/1949 | Vennice |
| 2,570,625 A | 10/1951 | Zimmerman et al. |
| 2,722,617 A | 11/1955 | Cluwen et al. |
| 3,102,314 A | 9/1963 | Alderfer |
| 3,208,296 A | 9/1965 | Baermann |
| 3,238,399 A | 3/1966 | Johanees et al. |
| 3,288,511 A | 11/1966 | Tavano |
| 3,408,104 A | 10/1968 | Raynes |
| 2,932,545 A | 4/1969 | Foley |
| 3,468,576 A | 9/1969 | Beyer et al. |
| 3,474,366 A | 10/1969 | Barney |
| 3,684,992 A | 8/1972 | Huguet et al. |
| 3,696,258 A | 10/1972 | Anderson et al. |

(Continued)

FOREIGN PATENT DOCUMENTS

DE  2938782 A1  4/1981

(Continued)

OTHER PUBLICATIONS

Series BNS, Compatible Series AES Safety Controllers, http://www.schmersalusa.com/safety_controllers/drawings/aes.pdf, pp. 159-175, date unknown.

(Continued)

*Primary Examiner* — Ramon Barrera
(74) *Attorney, Agent, or Firm* — Venable LLP; Robert S. Babayi

(57) ABSTRACT

A multi-level magnetic system includes first and second magnetic structures and transitions between an attract mode and a repel mode when the first and second magnetic structures are separated by an equilibrium separation distance. The multi-level magnetic system is placed between two objects and configured to oscillate about the equilibrium separation distance in response to a vibration from a motion source. The oscillation about the equilibrium separation distance causes the multi-level magnetic system to function as a low pass filter that substantially attenuates vibrations above a cutoff frequency thereby limiting the conducting of the vibration between the two objects.

20 Claims, 11 Drawing Sheets

U.S. PATENT DOCUMENTS

| | | |
|---|---|---|
| 3,790,197 A | 2/1974 | Parker |
| 3,791,309 A | 2/1974 | Baermann |
| 3,802,034 A | 4/1974 | Bookless |
| 3,845,430 A | 10/1974 | Petkewicz et al. |
| 3,893,059 A | 7/1975 | Nowak |
| 4,079,558 A | 3/1978 | Forham |
| 4,129,846 A | 12/1978 | Yablochnikov |
| 4,222,489 A | 9/1980 | Hutter |
| 4,416,127 A | 11/1983 | Gomez-Olea Naveda |
| 4,453,294 A | 6/1984 | Morita |
| 4,535,278 A | 8/1985 | Asakawa |
| 4,547,756 A | 10/1985 | Miller et al. |
| 4,629,131 A | 12/1986 | Podell |
| 4,849,749 A | 7/1989 | Fukamachi et al. |
| 4,912,727 A | 3/1990 | Schubert |
| 4,941,236 A | 7/1990 | Sherman et al. |
| 5,020,625 A | 6/1991 | Yamauchi et al. |
| 5,050,276 A | 9/1991 | Pemberton |
| 5,345,207 A | 9/1994 | Gebele |
| 5,367,891 A | 11/1994 | Furuyama |
| 5,383,049 A | 1/1995 | Carr |
| 5,440,997 A | 8/1995 | Crowley |
| 5,461,386 A | 10/1995 | Knebelkamp |
| 5,492,572 A | 2/1996 | Schroeder et al. |
| 5,495,221 A | 2/1996 | Post |
| 5,512,732 A | 4/1996 | Yagnik et al. |
| 5,570,084 A | 10/1996 | Ritter et al. |
| 5,604,960 A | 2/1997 | Good |
| 5,631,093 A | 5/1997 | Perry et al. |
| 5,631,618 A | 5/1997 | Trumper et al. |
| 5,637,972 A | 6/1997 | Randall et al. |
| 5,852,393 A | 12/1998 | Reznik et al. |
| 5,956,778 A | 9/1999 | Godoy |
| 5,983,406 A | 11/1999 | Meyerrose |
| 6,072,251 A | 6/2000 | Markle |
| 6,115,849 A | 9/2000 | Meyerrose |
| 6,118,271 A | 9/2000 | Ely et al. |
| 6,170,131 B1 | 1/2001 | Shin |
| 6,205,012 B1 | 3/2001 | Lear |
| 6,275,778 B1 | 8/2001 | Shimada et al. |
| 6,285,097 B1 | 9/2001 | Hazelton et al. |
| 6,387,096 B1 | 5/2002 | Hyde, Jr. |
| 6,457,179 B1 | 10/2002 | Prendergast |
| 6,467,326 B1 | 10/2002 | Garrigus |
| 6,607,304 B1 | 8/2003 | Lake et al. |
| 6,653,919 B2 | 11/2003 | Shih-Chung et al. |
| 6,720,698 B2 | 4/2004 | Galbraith |
| 6,842,332 B1 | 1/2005 | Rubenson et al. |
| 6,847,134 B2 | 1/2005 | Frissen et al. |
| 6,850,139 B1 | 2/2005 | Dettmann et al. |
| 6,862,748 B2 | 3/2005 | Prendergast |
| 6,927,657 B1 | 8/2005 | Wu |
| 6,971,147 B2 | 12/2005 | Halstead |
| 7,016,492 B2 | 3/2006 | Pan et al. |
| 7,031,160 B2 | 4/2006 | Tillotson |
| 7,065,860 B2 | 6/2006 | Aoki et al. |
| 7,066,778 B2 | 6/2006 | Kretzschmar |
| 7,362,018 B1 | 4/2008 | Kulogo et al. |
| 7,444,683 B2 | 11/2008 | Prendergast et al. |
| 7,583,500 B2 | 9/2009 | Ligtenberg et al. |
| 7,775,567 B2 | 8/2010 | Ligtenberg et al. |
| 7,808,349 B2 | 10/2010 | Fullerton et al. |
| 7,812,697 B2 | 10/2010 | Fullerton et al. |
| 7,839,246 B2 | 11/2010 | Fullerton et al. |
| 7,868,721 B2 | 1/2011 | Fullerton et al. |
| 2004/0003487 A1 | 1/2004 | Reiter |
| 2004/0155748 A1 | 8/2004 | Steingroever |
| 2004/0244636 A1 | 12/2004 | Meadow et al. |
| 2004/0251759 A1 | 12/2004 | Hirzel |
| 2005/0102802 A1 | 5/2005 | Sitbon et al. |
| 2005/0231046 A1 | 10/2005 | Aoshima |
| 2006/0066428 A1 | 3/2006 | McCarthy et al. |
| 2006/0189259 A1 | 8/2006 | Park et al. |
| 2006/0214756 A1 | 9/2006 | Elliott et al. |
| 2006/0290451 A1 | 12/2006 | Prendergast et al. |
| 2007/0075594 A1 | 4/2007 | Sadler |
| 2007/0138806 A1 | 6/2007 | Ligtenberg et al. |
| 2008/0139261 A1 | 6/2008 | Cho et al. |
| 2008/0181804 A1 | 7/2008 | Tanigawa et al. |
| 2008/0186683 A1 | 8/2008 | Ligtenberg et al. |
| 2008/0272868 A1 | 11/2008 | Prendergast et al. |
| 2008/0278668 A1 | 11/2008 | Prendergast et al. |
| 2008/0282517 A1 | 11/2008 | Claro |
| 2009/0021333 A1 | 1/2009 | Fiedler |
| 2010/0033280 A1 | 2/2010 | Bird et al. |
| 2011/0210636 A1 | 9/2011 | Kuhlmann-Wilsdorf |

FOREIGN PATENT DOCUMENTS

| | | |
|---|---|---|
| EP | 0 345 554 A1 | 12/1989 |
| EP | 0 545 737 A1 | 6/1993 |
| FR | 823395 | 1/1938 |
| GB | 1 495 677 A | 12/1977 |
| JP | 60-091011 U | 5/1985 |
| WO | WO-02/31945 A2 | 4/2002 |
| WO | WO-2007/081830 A2 | 7/2007 |
| WO | WO-2009/124030 A1 | 10/2009 |

OTHER PUBLICATIONS

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog_pdfs/BNS_B20.pdf, 2 pages, date unknown.

Seris BNS333, Coded-Magnet Sensors with Integral Safety Control Module, http://www.schmersalusa.com/machine_guarding/coded_magnet/drawings/bns333.pdf, 2 pages, date unknown.

Wikipedia, "Barker Code", Web article, last modified Aug. 2, 2008, 2 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Golomb Ruler", Web article, last modified Nov. 4, 2008, 3 pages.

Wikipedia, "Costas Array", Web article, last modified Oct. 7, 2008, 4 pages.

Wikipedia, "Walsh Code", Web article, last modified Sep. 17, 2008, 2 pages.

Wikipedia, "Gold Code", Web article, last modified Jul. 27, 2008, 1 page.

Wikipedia, "Bitter Electromagnet", Web article, last modified Aug. 2011, 1 page.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Mar. 12, 2012, issued in counterpart U.S. Appl. No. 12/206,270.

United States Office Action, dated Feb. 22, 2011, issued in counterpart U.S. Appl. No. 12/476,952.

United States Office Action, dated Oct. 12, 2011, issued in counterpart U.S. Appl. No. 12/476,952.

United States Office Action, dated Mar. 9, 2012, issued in counterpart U.S. Appl. No. 13/371,280.

International Search Report and Written Opinion, dated May 14, 2009, issued in related International Application No. PCT/US2009/038925.

International Search Report and Written Opinion, dated Jul. 13, 2010, issued in related International Application No. PCT/US2010/021612.

International Search Report and Written Opinion dated Jun. 1, 2009, issued in related International Application No. PCT/US2009/002027.

International Search Report and Written Opinion, dated Aug. 18, 2010, issued in related International Application No. PCT/US2010/036443.

International Search Report and Written Opinion, dated Apr. 8, 2011 issued in related International Application No. PCT/US2010/049410.

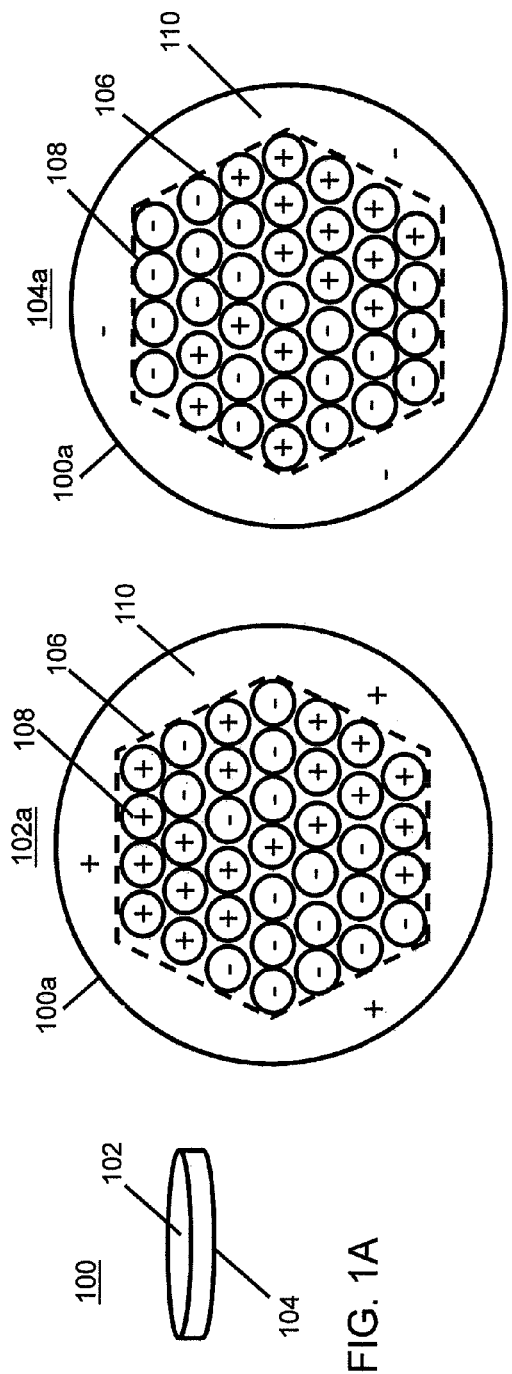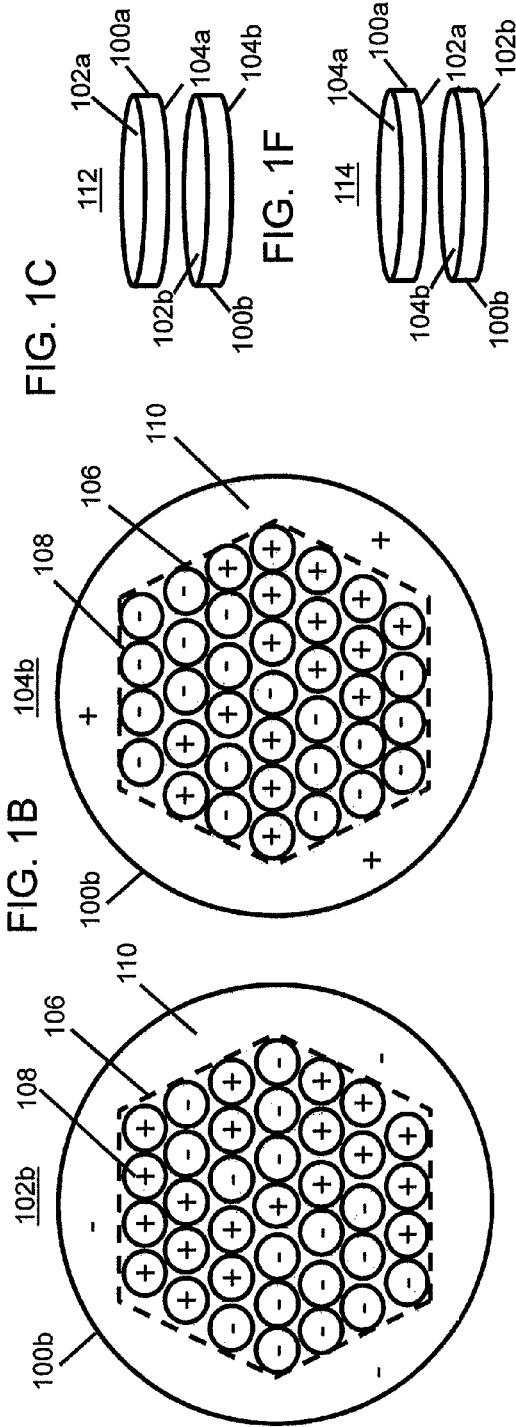

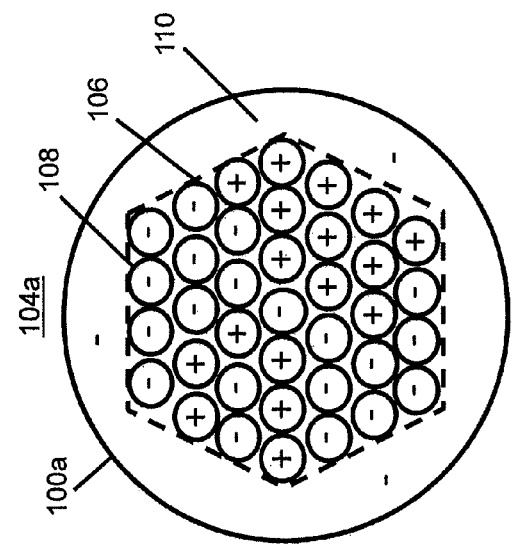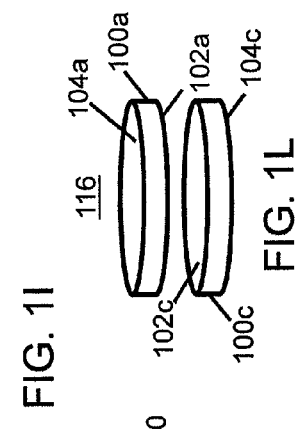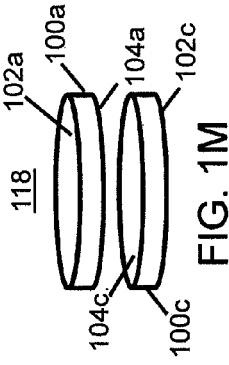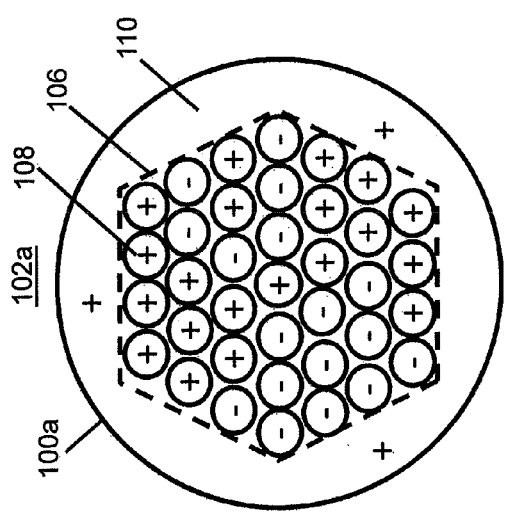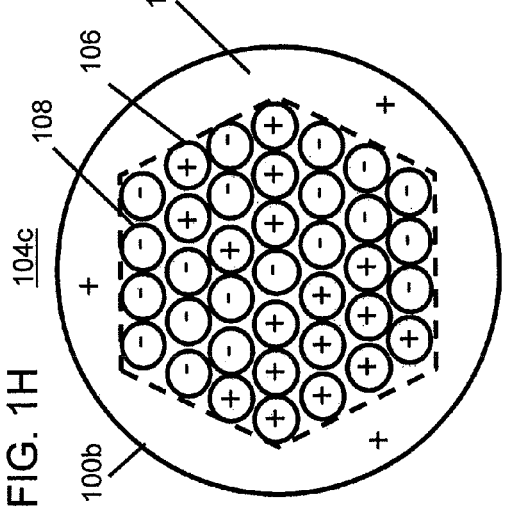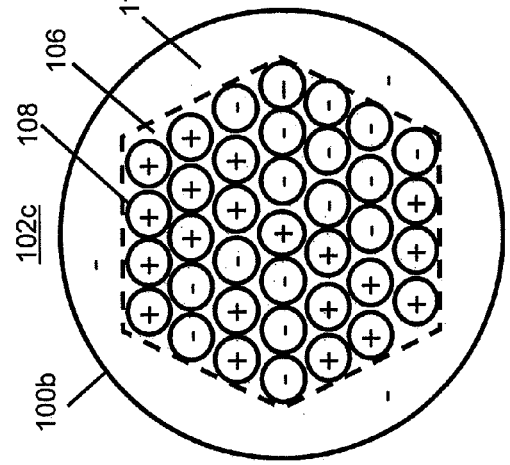

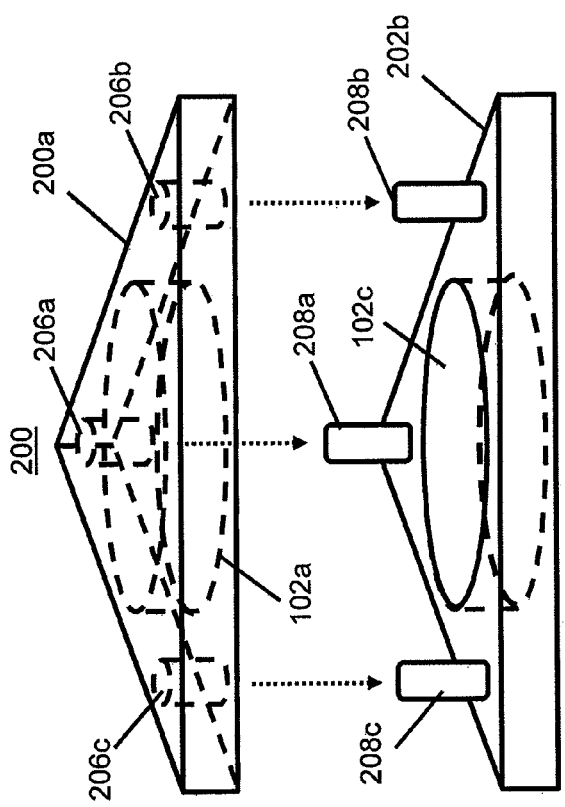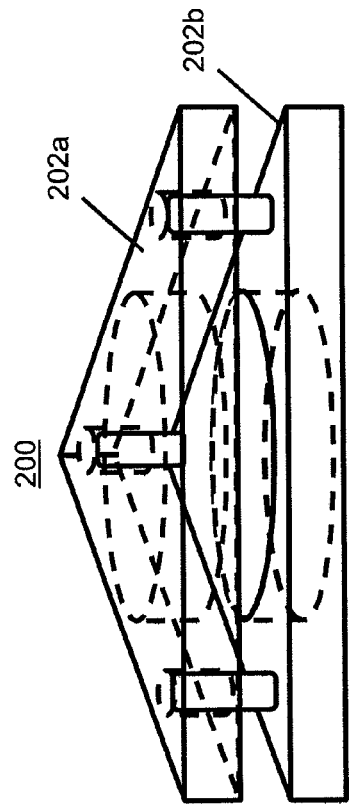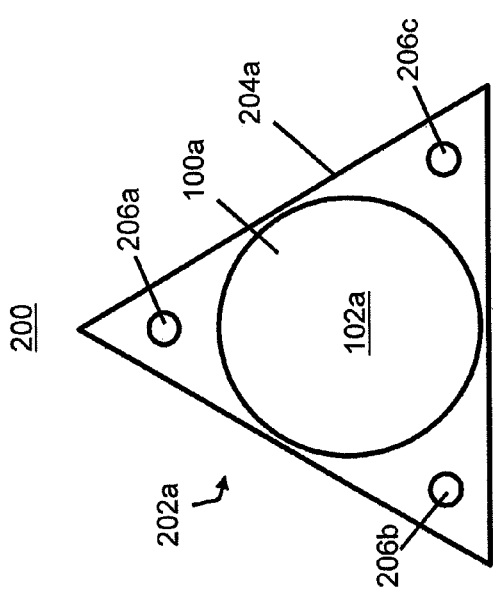
FIG. 2B
FIG. 2C
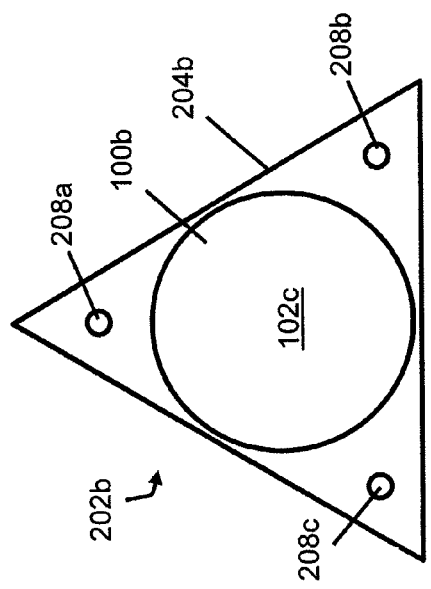
FIG. 2A

MULTI-LEVEL MAGNETIC SYSTEM FOR ISOLATION OF VIBRATION

RELATED APPLICATIONS

This non-provisional application claims the benefit under 35 USC 119(e) of prior provisional application 61/461,570 titled "A System and Method for Controlling Mechanical Impedance" filed Jan. 20, 2011 by Fullerton et al, which is incorporated by reference in its entirety herein.

FIELD OF THE INVENTION

The present invention relates generally to a system for controlling frequency dependent mechanical impedance. More particularly, the present invention relates to a system for isolation of vibration between objects using multi-level correlated magnetic structures.

BACKGROUND OF THE INVENTION

As described on Wikipedia at http://en.wikipedia.org/wiki/Vibration, which is incorporated by reference herein, vibration refers to mechanical oscillations about an equilibrium point. The oscillations may be periodic such as the motion of a pendulum or random such as the movement of a tire on a gravel road. Vibration is occasionally "desirable". For example the motion of a tuning fork, the reed in a woodwind instrument or harmonica, or the cone of a loudspeaker is desirable vibration, necessary for the correct functioning of the various devices. More often, vibration is undesirable, wasting energy and creating unwanted sound—noise. For example, the vibrational motions of engines, electric motors, or any mechanical device in operation are typically unwanted. Such vibrations can be caused by imbalances in the rotating parts, uneven friction, the meshing of gear teeth, etc.

There are two classes of vibration. Free vibration occurs when a mechanical system is set off with an initial input and then allowed to vibrate freely. Examples of this type of vibration are pulling a child back on a swing and then letting go or hitting a tuning fork and letting it ring. The mechanical system will then vibrate at one or more of its "natural frequencies" and damp down to zero. Forced vibration is when an alternating force or motion is applied to a mechanical system. Examples of this type of vibration include a shaking washing machine due to an imbalance, transportation vibration (caused by truck engine, springs, road, etc.), or the vibration of a building during an earthquake. In forced vibration the frequency of the vibration is the frequency of the force or motion applied, with order of magnitude being dependent on the actual mechanical system.

The fundamentals of vibration analysis can be understood by studying the simple mass-spring-damper model. Indeed, even a complex structure such as an automobile body can be modeled as a "summation" of simple mass-spring-damper models. The mass-spring-damper model is an example of a simple harmonic oscillator. The mathematics used to describe its behavior is identical to other simple harmonic oscillators such as the RLC circuit.

To start the investigation of the mass-spring-damper one can assume the damping is negligible and that there is no external force applied to the mass (i.e. free vibration). The force applied to the mass by a spring is proportional to the amount the spring is stretched "x". The proportionality constant, k, is the stiffness of the spring and has units of force/distance (e.g. lbf/in or N/m). The negative sign indicates that the force is always opposing the motion of the mass attached to it.

$$F_s = -kx.$$

The force generated by the mass is proportional to the acceleration of the mass as given by Newton's second law of motion.

$$\sum F = ma = m\ddot{x} = m\frac{d^2 x}{dt^2}.$$

The sum of the forces on the mass then generates the ordinary differential equation:

$$m\ddot{x} + kx = 0.$$

If we assume that we start the system to vibrate by stretching the spring by the distance of A and letting go, the solution to the above equation that describes the motion of mass is:

$$x(t) = A\cos(2\pi f_n t).$$

This solution says that it will oscillate with simple harmonic motion that has an amplitude of A and a frequency of $f_n$. The number $f_n$ is one of the most important quantities in vibration analysis and is called the undamped natural frequency. For the simple mass-spring system, $f_n$ is defined as:

$$f_n = \frac{1}{2\pi}\sqrt{\frac{k}{m}}.$$

Angular frequency $\omega$ ($\omega = 2\pi f$) with the units of radians per second is often used in equations because it simplifies the equations, but is normally converted to "standard" frequency (units of Hz or equivalently cycles per second) when stating the frequency of a system.

If you know the mass and stiffness of the system you can determine the frequency at which the system will vibrate once it is set in motion by an initial disturbance using the above stated formula. Every vibrating system has one or more natural frequencies that it will vibrate at once it is disturbed. This simple relation can be used to understand in general what will happen to a more complex system once we add mass or stiffness. For example, the above formula explains why when a car or truck is fully loaded the suspension will feel "softer" than unloaded because the mass has increased and therefore reduced the natural frequency of the system while the spring stiffness remains constant.

Vibrational motion could be understood in terms of conservation of energy. In the above example we have extended the spring by a value of x and therefore have stored some potential energy ($\frac{1}{2}kx^2$) in the spring. Once we let go of the spring, the spring tries to return to its un-stretched state (which is the minimum potential energy state) and in the process accelerates the mass. At the point where the spring has reached its un-stretched state all the potential energy that we supplied by stretching it has been transformed into kinetic energy ($\frac{1}{2}mv^2$). The mass then begins to decelerate because it is now compressing the spring and in the process transferring the kinetic energy back to its potential. Thus oscillation of the spring amounts to the transferring back and forth of the kinetic energy into potential energy.

In the simple model the mass will continue to oscillate forever at the same magnitude, but in a real system there is always something called damping that dissipates the energy, eventually bringing it to rest.

A "viscous" damper can be added to the model that outputs a force that is proportional to the velocity of the mass. The damping is called viscous because it models the effects of an object within a fluid. The proportionality constant c is called the damping coefficient and has units of Force over velocity (lbf s/in or N s/m).

$$F_d = -cv = -c\dot{x} = -c\frac{dx}{dt}.$$

By summing the forces on the mass we get the following ordinary differential equation:

$$m\ddot{x}+c\dot{x}+kx=0$$

The solution to this equation depends on the amount of damping. If the damping is small enough the system will still vibrate, but eventually, over time, will stop vibrating. This case is called underdamping—this case is of most interest in vibration analysis. If we increase the damping just to the point where the system no longer oscillates, we reach the point of critical damping (if the damping is increased past critical damping the system is called overdamped). The value that the damping coefficient needs to reach for critical damping in the mass spring damper model is:

$$C_c = 2\sqrt{km}.$$

To characterize the amount of damping in a system a ratio called the damping ratio (also known as damping factor and % critical damping) is used. This damping ratio is just a ratio of the actual damping over the amount of damping required to reach critical damping. The formula for the damping ratio ($\zeta$) of the mass spring damper model is:

$$\zeta = \frac{c}{2\sqrt{km}}.$$

For example, metal structures (e.g. airplane fuselage, engine crankshaft) will have damping factors less than 0.05 while automotive suspensions in the range of 0.2-0.3.

The solution to the underdamped system for the mass spring damper model is the following:

$$x(t)=Xe^{-\zeta\omega_n t}\cos(\sqrt{1-\zeta^2}\omega_n t-\phi), \omega_n=2\pi f_n.$$

The value of X, the initial magnitude, and $\phi$, the phase shift, are determined by the amount the spring is stretched. The formulas for these values can be found in the references.

The major points to note from the solution are the exponential term and the cosine function. The exponential term defines how quickly the system "damps" down—the larger the damping ratio, the quicker it damps to zero. The cosine function is the oscillating portion of the solution, but the frequency of the oscillations is different from the undamped case.

The frequency in this case is called the "damped natural frequency", $f_d$, and is related to the undamped natural frequency by the following formula:

$$f_d=\sqrt{1-\zeta^2}f_n.$$

The damped natural frequency is less than the undamped natural frequency, but for many practical cases the damping ratio is relatively small and hence the difference is negligible. Therefore the damped and undamped description are often dropped when stating the natural frequency (e.g. with 0.1 damping ratio, the damped natural frequency is only 1% less than the undamped).

We will now describe the behavior of the spring mass damper model when we add a harmonic force in the form below. A force of this type could, for example, be generated by a rotating imbalance.

$$F=F_0\cos(2\pi ft)$$

If we again sum the forces on the mass we get the following ordinary differential equation:

$$m\ddot{x}+c\dot{x}+kx=F_0\cos(2\pi ft).$$

The steady state solution of this problem can be written as:

$$x(t)=X\cos(2\pi ft-\phi).$$

The result states that the mass will oscillate at the same frequency, f, of the applied force, but with a phase shift $\phi$.

The amplitude of the vibration "X" is defined by the following formula.

$$X = \frac{F_0}{k}\frac{1}{\sqrt{(1-r^2)^2+(2\zeta r)^2}}.$$

Where "r" is defined as the ratio of the harmonic force frequency over the undamped natural frequency of the mass-spring-damper model.

$$r = \frac{f}{f_n}.$$

The phase shift, $\phi$, is defined by the following formula.

$$\phi = \arctan\left(\frac{2\zeta r}{1-r^2}\right).$$

The plots of the amplitude and phase functions provided in FIGS. 7A and 7B, which correspond to the "frequency response of the system", present one of the most important features in forced vibration. In a lightly damped system when the forcing frequency nears the natural frequency ($r\approx 1$) the amplitude of the vibration can get extremely high. This phenomenon is called resonance (subsequently the natural frequency of a system is often referred to as the resonant frequency). In rotor bearing systems any rotational speed that excites a resonant frequency is referred to as a critical speed.

If resonance occurs in a mechanical system it can be very harmful—leading to eventual failure of the system. Consequently, one of the major reasons for vibration analysis is to predict when this type of resonance may occur and then to determine what steps to take to prevent it from occurring. As the amplitude plot shows, adding damping can significantly reduce the magnitude of the vibration. Also, the magnitude can be reduced if the natural frequency can be shifted away from the forcing frequency by changing the stiffness or mass of the system. If the system cannot be changed, perhaps the forcing frequency can be shifted (for example, changing the speed of the machine generating the force).

The following are some other points in regards to the forced vibration shown in the frequency response plots.

At a given frequency ratio, the amplitude of the vibration, X, is directly proportional to the amplitude of the force $F_0$ (e.g. if you double the force, the vibration doubles)

With little or no damping, the vibration is in phase with the forcing frequency when the frequency ratio r<1 and 180 degrees out of phase when the frequency ratio r>1

When r<<1 the amplitude is just the deflection of the spring under the static force $F_0$. This deflection is called the static deflection $\delta_{st}$. Hence, when r<<1 the effects of the damper and the mass are minimal.

When r>>1 the amplitude of the vibration is actually less than the static deflection $\delta_{st}$. In this region the force generated by the mass (F=ma) is dominating because the acceleration seen by the mass increases with the frequency. Since the deflection seen in the spring, X, is reduced in this region, the force transmitted by the spring (F=kx) to the base is reduced. Therefore the mass-spring-damper system is isolating the harmonic force from the mounting base—referred to as vibration isolation. Interestingly, more damping actually reduces the effects of vibration isolation when r>>1 because the damping force (F=cv) is also transmitted to the base.

Resonance is simple to understand if you view the spring and mass as energy storage elements—with the mass storing kinetic energy and the spring storing potential energy. As discussed earlier, when the mass and spring have no external force acting on them they transfer energy back and forth at a rate equal to the natural frequency. In other words, if energy is to be efficiently pumped into both the mass and spring the energy source needs to feed the energy in at a rate equal to the natural frequency. Applying a force to the mass and spring is similar to pushing a child on swing, you need to push at the correct moment if you want the swing to get higher and higher. As in the case of the swing, the force applied does not necessarily have to be high to get large motions; the pushes just need to keep adding energy into the system.

The damper, instead of storing energy, dissipates energy. Since the damping force is proportional to the velocity, the more the motion, the more the damper dissipates the energy. Therefore a point will come when the energy dissipated by the damper will equal the energy being fed in by the force. At this point, the system has reached its maximum amplitude and will continue to vibrate at this level as long as the force applied stays the same. If no damping exists, there is nothing to dissipate the energy and therefore theoretically the motion will continue to grow on into infinity.

In a previous example only a simple harmonic force was applied to the model, but this can be extended considerably using two powerful mathematical tools. The first is the Fourier transform that takes a signal as a function of time (time domain) and breaks it down into its harmonic components as a function of frequency (frequency domain). For example, let us apply a force to the mass-spring-damper model that repeats the following cycle—a force equal to 1 newton for 0.5 second and then no force for 0.5 second. This type of force has the shape of a 1 Hz square wave.

The Fourier transform of the square wave generates a frequency spectrum that presents the magnitude of the harmonics that make up the square wave (the phase is also generated, but is typically of less concern and therefore is often not plotted). The Fourier transform can also be used to analyze non-periodic functions such as transients (e.g. impulses) and random functions. With the advent of the modern computer the Fourier transform is almost always computed using the Fast Fourier Transform (FFT) computer algorithm in combination with a window function.

In the case of our square wave force, the first component is actually a constant force of 0.5 newton and is represented by a value at "0" Hz in the frequency spectrum. The next component is a 1 Hz sine wave with an amplitude of 0.64. This is shown by the line at 1 Hz. The remaining components are at odd frequencies and it takes an infinite amount of sine waves to generate the perfect square wave. Hence, the Fourier transform allows you to interpret the force as a sum of sinusoidal forces being applied instead of a more "complex" force (e.g. a square wave).

In the previous section, the vibration solution was given for a single harmonic force, but the Fourier transform will in general give multiple harmonic forces. The second mathematical tool, "the principle of superposition", allows you to sum the solutions from multiple forces if the system is linear. In the case of the spring-mass-damper model, the system is linear if the spring force is proportional to the displacement and the damping is proportional to the velocity over the range of motion of interest. Hence, the solution to the problem with a square wave is summing the predicted vibration from each one of the harmonic forces found in the frequency spectrum of the square wave.

We can view the solution of a vibration problem as an input/output relation—where the force is the input and the output is the vibration. If we represent the force and vibration in the frequency domain (magnitude and phase) we can write the following relation:

$$X(\omega) = H(\omega) \cdot F(\omega) \text{ or } H(\omega) = \frac{X(\omega)}{F(\omega)}.$$

$H(\omega)$ is called the frequency response function (also referred to as the transfer function, but not technically as accurate) and has both a magnitude and phase component (if represented as a complex number, a real and imaginary component). The magnitude of the frequency response function (FRF) was presented earlier for the mass-spring-damper system.

$$|H(\omega)| = \left|\frac{X(\omega)}{F(\omega)}\right| = \frac{1}{k}\frac{1}{\sqrt{(1-r^2)^2 + (2\zeta r)^2}}; \text{ where } r = \frac{f}{f_n} = \frac{\omega}{\omega_n},$$

The phase of the FRF was also presented earlier as:

$$\angle H(\omega) = \arctan\left(\frac{2\zeta r}{1-r^2}\right).$$

For example, let us calculate the FRF for a mass-spring-damper system with a mass of 1 kg, spring stiffness of 1.93 N/mm and a damping ratio of 0.1. The values of the spring and mass give a natural frequency of 7 Hz for this specific system. If we apply the 1 Hz square wave from earlier we can calculate the predicted vibration of the mass. FIG. 8 illustrates the resulting vibration. It happens in this example that the fourth harmonic of the square wave falls at 7 Hz. The frequency response of the mass-spring-damper therefore outputs a high 7 Hz vibration even though the input force had a relatively low 7 Hz harmonic. This example highlights that the resulting vibration is dependent on both the forcing function and the system that the force is applied to.

FIG. 8 also shows the time domain representation of the resulting vibration. This is done by performing an inverse Fourier Transform that converts frequency domain data to time domain. In practice, this is rarely done because the frequency spectrum provides all the necessary information.

The frequency response function (FRF) does not necessarily have to be calculated from the knowledge of the mass, damping, and stiffness of the system, but can be measured experimentally. For example, if you apply a known force and sweep the frequency and then measure the resulting vibration you can calculate the frequency response function and then characterize the system. This technique is used in the field of experimental modal analysis to determine the vibration characteristics of a structure.

As described on Wikipedia at http://en.wikipedia.org/wiki/Q_factor, which is incorporated by reference herein, vibration can also be described in relation to a quality (or Q) factor. In physics and engineering the quality factor or Q factor is a dimensionless parameter that describes how under-damped an oscillator or resonator is, or equivalently, characterizes a resonator's bandwidth relative to its center frequency. Higher Q indicates a lower rate of energy loss relative to the stored energy of the oscillator; the oscillations die out more slowly. A pendulum suspended from a high-quality bearing, oscillating in air, has a high Q, while a pendulum immersed in oil has a low one. Oscillators with high quality factors have low damping so that they ring longer.

Sinusoidally driven resonators having higher Q factors resonate with greater amplitudes (at the resonant frequency) but have a smaller range of frequencies around that frequency for which they resonate; the range of frequencies for which the oscillator resonates is called the bandwidth. Thus, a high Q tuned circuit in a radio receiver would be more difficult to tune, but would have more selectivity; it would do a better job of filtering out signals from other stations that lie nearby on the spectrum. High Q oscillators oscillate with a smaller range of frequencies and are more stable.

The quality factor of oscillators varies substantially from system to system. Systems for which damping is important (such as dampers keeping a door from slamming shut) have Q=½. Clocks, lasers, and other resonating systems that need either strong resonance or high frequency stability need high quality factors. Tuning forks have quality factors around Q=1000. The quality factor of atomic clocks, superconducting RF cavities used in accelerators, and some high-Q lasers can reach as high as $10^{11}$ and higher.

There are many alternative quantities used by physicists and engineers to describe how damped an oscillator is and that are closely related to the quality factor. Important examples include: the damping ratio, relative bandwidth, linewidth and bandwidth measured in octaves.

The concept of Q factor originated in electronic engineering, as a measure of the 'quality' desired in a good tuned circuit or other resonator.

As described at http://www.deicon.com/vib_categ, which is incorporated by reference herein, there are several basic approaches for controlling noise and vibration of a vibratory system. One common approach used to mitigate sound and vibration caused by acoustical/structural resonance, is adding damping to the acoustic plant and structure. Damping dissipates some of the sound/vibration energy by transforming it to heat.

Damping may or may not be effective depending on how close a disturbance frequency is to a resonant frequency being damped. In this case, passive or active cancellation solutions can be used to quiet a system. Passive sound/vibration cancellation is normally achieved by appending the oscillating system with a tuned absorber, e.g., Helmholtz resonators and quarter wave tubes (for sound) and dynamic absorbers (for vibration) with the natural frequency similar to the disturbing frequency.

Frequently, the goal of control is to prevent its transmission of sound/vibration to the surrounding. Such control schemes, known as 'isolation', are used extensively to isolate a noisy environment from a quiet one (in sound control), as well as machinery (industrial and marine), civil engineering structures (base isolation in building, bridges, etc.), and sensitive components from the foundation/base (in vibration control).

The most common passive isolation method is the use of sound barriers (in sound control) and mounting the vibrating structure/machine to the base via resilient elements, e.g., rubber, (in vibration control). Active isolation involves the use of actuators along with sensors and controllers (analog or digital) to create actuation with the goal of lowering the transmission of sound/vibration from one body to another. Although such isolation methods can be relatively successful isolating low frequency sound/vibration, high frequency sound/vibration is generally much more difficult to isolate. As such, there is a need for improved systems and methods for isolating vibration.

It is well known to apply mechanical impedance and mobility concepts in order to analyze vibratory systems to support corrective measures to control noise and vibration. As described in "A Guide to Mechanical Impedance and Structural Response Techniques', by H. P Olesen and R. B. Randall, Bruel & Kjaer Application Note No. 17-179, pp. 1-19. 1977, which is incorporated by reference herein, the basic concepts of mechanical impedance and mobility of forced vibratory systems were developed from electro-mechanical and electro-acoustic analogies in the 1920's. Generally, the mechanical impedance (F/v or Z) at a given point in a vibratory system is the ratio of the sinusoidal force applied to the system at that point to the velocity at the same point, where the dynamic mass (or apparent weight, F/a) is the ratio of the sinusoidal force to acceleration, and stiffness (F/d) is the ratio of the sinusoidal force to distance. Inversely, the mechanical admittance (or mobility, v/F) at a given point in a vibratory system is the ratio of the velocity applied to the system at that point to the sinusoidal force at the same point, the acceleration through force (a/F) is the ratio of acceleration to the sinusoidal force, and compliance (d/F) is the ratio of distance to the sinusoidal force. To solve vibrational problems, both a mechanical impedance may have to be measured and a narrow band frequency analysis may have to be performed to obtain detailed knowledge about the response ability of the structures (or objects) involved and of the actual responses or forces. From this information, the need or the possibility of corrective measures may be evaluated.

A lecture on simple acoustic filters by Dave L. Moulton at http://www.moultonworld. pwp.blueyonder.co.uk/Lecture9_page.htm, which is incorporated by reference herein, describes how common filters such as low pass, high pass, band pass and band stop filters can be realized in the acoustic domain. The lecture includes a discussion of a second order low pass filter circuit and includes a diagram of its frequency response, which is provided in FIG. 9. The diagram includes two frequency response curves that illustrate the effect of damping whereby under damping produces a resonance peak (or Laplace pole) and critical damping does not.

U.S. Pat. No. 4,912,727 to Wolfgang Schubert describes magnetic systems that transition from a mutual repel force to a mutual attract force depending on the distance of separation between pairs of magnetic components making up the magnetic systems. Schubert also describes the mutual repel force produced by the magnetic systems as providing a damping function. More specifically, Schubert teaches the mutual repel force produced by the magnetic system as being a means for decelerating the translational movement of the rails of a drawer guiding system and also being a means for accelerating the translational movement of the rails of the drawer guiding system.

The magnetic components of Schubert comprise complementary first portions each being two rows (or one dimensional arrays) of smaller alternating polarity individual magnets aligned with respect to a center line and complementary second portions each comprising a single larger magnet where the force curve produced by the two larger magnets must be "shallower" than the force curve produced by the rows of smaller alternating polarity individual magnets, but otherwise doesn't describe, teach, or suggest how or why the different shaped force curves are produced or can be affected.

SUMMARY OF THE INVENTION

In accordance with a first embodiment of the invention, a multi-level magnetic system for isolation of vibration above a cutoff frequency includes a first magnetic structure coupled to a first object at a first point, and a second magnetic structure coupled to a second object at a second point, where each one of the first magnetic structure and the second magnetic structure have a first portion comprising one or more first magnetic sources configured to produce an attractive force curve when the first and second magnetic structures are in a first relative alignment and each one of the first magnetic structure and the second magnetic structure have a second portion comprising one or more second magnetic sources configured to produce a repelling force curve when the first and second magnetic structures are in the first relative alignment, the attractive force curve and the repelling force curve causing a transition from a repel mode to an attract mode at an equilibrium separation distance between the first magnetic structure and the second magnetic structure where the attractive force equals the repelling force, at least one of the first magnetic structure or the second magnetic structure being configured to oscillate about the equilibrium separation distance in response to a vibration, the oscillation about the equilibrium being filtered to substantially attenuate vibrations above the cutoff frequency.

The vibration may be a free vibration or a forced vibration. The multi-level magnetic system may also include a source of motion for said vibration, said source of motion including one of a source of seismic motion, reciprocating motion, harmonic motion, linear motion, Brownian motion, circular motion, or rotary motion.

The first portion of the first magnetic structure and the first portion of the second magnetic structure may include a plurality of complementary coded magnetic sources.

The second portion of the first magnetic structure and the second portion of the second magnetic structure may include a plurality of anti-complementary coded magnetic sources.

The first portion of the first magnetic structure and the first portion of the second magnetic structure may include a plurality of complementary coded magnetic sources and the second portion of the first magnetic structure and the second portion of the second magnetic structure comprises a plurality of anti-complementary coded magnetic sources.

The repel mode may occur when the first magnetic structure and the second magnetic structure are separated by a distance less than the equilibrium separation distance and the attract mode may occur when the first magnetic structure and the second magnetic structure are separated by a distance greater than the equilibrium separation distance.

Alternatively, the repel mode may occur when the first magnetic structure and the second magnetic structure are separated by a distance greater than the equilibrium separation distance and the attract mode may occur when the first magnetic structure and the second magnetic structure are separated by a distance less than the equilibrium separation distance.

The multi-level magnetic system may also include a movement constraining structure for constraining at least one movement of one of the first magnetic structure of the second magnetic structure, where the movement constraining structure constrains at least one of a rotational motion or a sideways motion. The movement constraining structure may constrain at least one movement while the movement constraining structure is in a first state, where the at least one movement is not constrained or the at least one movement is constrained differently while the movement constraining structure is in a second state.

The multi-level magnetic system may also include a third magnetic structure coupled to the first object at a third point, and a fourth magnetic structure coupled to the second object at a fourth point, where the third magnetic structure and fourth magnetic structure substantially attenuate vibrations above a second cutoff frequency.

The first magnetic structure may include at least one of a permanent magnet, an electromagnet, or an electro-permanent magnet.

At least one of the first magnetic structure of the second magnetic structure my include magnetic sources printed into magnetizable material.

At least one of the first object or the second object comprises at least one of an acoustic device, a speaker, a microphone, a building, a bridge, a structure, an electronic component, aeronautics equipment, a frame of a plane, a mechanical system, or a fixed structure.

The cutoff frequency may be in accordance with at least one of a weight, a mechanical impedance, or a stiffness at one of the first point or the second point.

The first portions of the first and second magnetic structures may produce a second attractive force curve when the first and second magnetic structures are in a second relative alignment.

The second portions of the first and the second magnetic structures may produce a second repelling force curve when the first and second magnetic structures are in a second relative alignment.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A depicts an oblique view of an exemplary disk shaped correlated magnetic structure;

FIG. 1B depicts a top view of a first exemplary disk shaped correlated magnetic structure;

FIG. 1C depicts a bottom view of the first exemplary disk shaped correlated magnetic structure of FIG. 1B;

FIG. 1D depicts a top view of a second exemplary disk shaped correlated magnetic structure;

FIG. 1E depicts a bottom view of the second exemplary disk shaped correlated magnetic structure of FIG. 1D;

FIG. 1F depicts a first exemplary repel-snap multi-level correlated magnetic system;

FIG. 1G depicts a second exemplary repel-snap multi-level correlated magnetic system;

FIG. 1H depicts the same top view of the first correlated magnetic structure depicted in

FIG. 1B;

FIG. 1I depicts the same bottom view of the first correlated magnetic structure depicted in FIG. 1C;

FIG. 1J depicts a top view of a third exemplary disk shaped correlated magnetic structure;

FIG. 1K depicts a bottom view of the third exemplary disk shaped correlated magnetic structure of FIG. 1J;

FIG. 1L depicts a first exemplary contactless attachment multi-level correlated magnetic system;

FIG. 1M depicts a second exemplary contactless attachment multi-level correlated magnetic system;

FIG. 2A depicts a top view of two portions of an exemplary mechanical isolator;

FIG. 2B depicts the alignment of the pegs and holes of the two portions of the mechanical isolator of FIG. 2A;

FIG. 2C depicts the exemplary mechanical isolator of FIG. 2A and FIG. 2B after the pegs of the second portion have been placed into the holes of the first portion;

DETAILED DESCRIPTION OF THE INVENTION

Figure 2D:
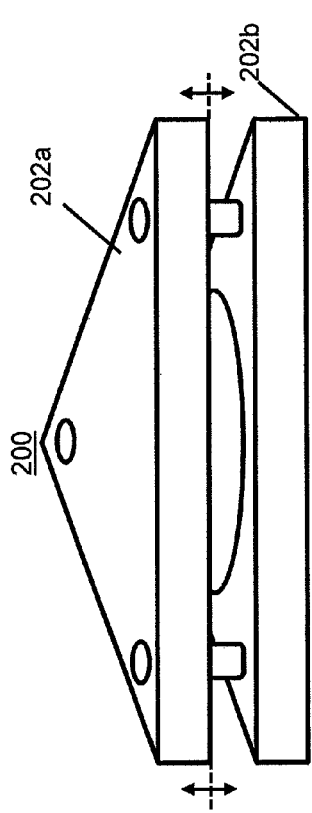
FIG. 2D depicts the two portions of the exemplary mechanical isolator of FIG. 2A and FIG. 2B with an equilibrium separation distance.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention provides a system for controlling mechanical impedance using correlated magnetic structures configured as multi-level correlated magnetic systems. It involves magnetic techniques related to those described in U.S. Pat. No. 7,800,471, issued Sep. 21, 2010, U.S. Pat. No. 7,868,721, issued Jan. 11, 2011, U.S. patent application Ser. No. 12/476,952, filed Jun. 2, 2009, and U.S. patent application Ser. No. 12/885,450, filed Sep. 18, 2010, which are all incorporated herein by reference in their entirety. The present invention may be applicable to systems and methods described in U.S. Pat. No. 7,681,256, issued Mar. 23, 2010, U.S. Pat. No. 7,750,781, issued Jul. 6, 2010, U.S. Pat. No. 7,755,462, issued Jul. 13, 2010, U.S. Pat. No. 7,812,698, issued Oct. 12, 2010, U.S. Pat. Nos. 7,817,002, 7,817,003, 7,817,004, 7,817,005, and 7,817,006, issued Oct. 19, 2010, U.S. Pat. No. 7,821,367, issued Oct. 26, 2010, U.S. Pat. Nos. 7,823,300 and 7,824,083, issued Nov. 2, 2010, U.S. Pat. No. 7,834,729, issued Nov. 16, 2010, U.S. Pat. No. 7,839,247, issued Nov. 23, 2010, and U.S. Pat. Nos. 7,843,295, 7,843,296, and 7,843,297, issued Nov. 30, 2010, and U.S. patent application Ser. No. 12/322,561, filed Feb. 4, 2009, U.S. Pat. Nos. 7,956,711 and 7,956,712, issued Jun. 7, 2011, U.S. Pat. Nos. 7,958,575 and 7,961,068, issued Jun. 14, 2011, U.S. Pat. No. 7,963,818, issued Jun. 21, 2011, U.S. Pat. No. 7,893,803, issued Feb. 22, 2011, U.S. patent application Ser. No. 12/895,589, filed Sep. 30, 2010, and U.S. Pat. Nos. 8,015,752, 8,016,330, issued Sep. 13, 2011, and U.S. Pat. No. 8,035,260, issued Oct. 11, 2011, which are all incorporated by reference herein in their entirety. The invention may also incorporate techniques described in U.S. Provisional Patent Application 61/403,814, filed Sep. 22, 2010, U.S. Provisional Patent Application 61/455,820, filed Oct. 27, 2010, and U.S. Provisional Patent Application 61/459,329, filed Dec. 10, 2010, which are all incorporated by reference herein in their entirety.

In accordance with the invention, a multi-level correlated magnetic system is used as a mechanical (or acoustic) isolator to limit vibration conduction from one object to another object. Essentially, the multi-level correlated magnetic system functions as a low pass filter by attenuating vibrations above a certain cutoff frequency. Generally, if filtered vibrations are fast (e.g., above 10 Hz), the multi-level correlated magnetic system would typically be called an acoustic filter, while if filtered vibrations are slow (e.g., below 10 Hz), the multi-level correlated magnetic system would typically be called a mechanical filter.

In accordance with the invention, a vibration can be any type of motion between two objects such as seismic motion, reciprocating motion, harmonic motion, linear motion, Brownian Motion, circular motion, or rotary motion.

In accordance with one embodiment of the present invention, a multilevel magnetic system involves a first magnetic structure and a second magnetic structure each having a first portion comprising one or more magnetic sources configured to attract the other magnetic structure and each having a second portion comprising one or more magnetic sources configured to repel the other magnetic structure.

In accordance with a second embodiment of the present invention, one portion of the two magnetic structures comprises a plurality of complementary coded magnetic sources or anti-complementary coded magnetic sources.

In accordance with a third embodiment of the present invention, both portions of the two magnetic structures comprise a plurality of complementary coded magnetic sources and/or anti-complementary coded magnetic sources.

For each of the embodiments, when the first magnetic structure is a certain separation distance apart from the second magnetic structure (i.e., at a transition distance), the multilevel magnetic system transitions from either a repel mode to an attract mode or from an attract mode to a repel mode. Thus, the multilevel magnetic system has a repel level (or repel region) and an attract level (or attract region).

The first portion of each of the two magnetic structures can be described as being a short range portion, and the second portion of each of the two magnetic structures can be described as being a long range portion, where the short range portion and the long range portion produce opposing forces that effectively work against each other. The short range portion produces a magnetic field having a higher near field density and a lesser far field density than the magnetic field produced by the long range portion. Because of these near field and far field density differences, the short range portion produces a higher peak force than the long range portion yet has a faster field extinction rate such that the short range portion is stronger than the long range portion at separation distances less than the transition distance and weaker than the long range portion at separation distance greater than the transition distance, where the forces produced by two portions cancel each other when the two magnetic structures are separated by a distance equal to the transition distance.

The first and second portions of the two magnetic structures produce two opposite polarity force curves corresponding to the attractive force versus the separation distance between the two magnetic structures and the repulsive force versus the separation distance between the two magnetic structures.

In accordance with another embodiment of the invention, the first (short range) portions of the two magnetic structures produce an attractive (attract) force and the second (long range) portions of the two magnetic structures produce a repulsive (repel) force. With this arrangement, as the two complementary structures are brought near each other they initially repel each other until they are at a transition distance, where they neither attract nor repel, and then when they are brought together closer than the transition distance they begin to attract strongly, behaving as a "snap." With this embodiment, the attraction curve is shorter range but its peak force is stronger than the longer range repulsive force curve. This multi-level correlated magnetic system is referred to as a repel-snap multi-level correlated magnetic system.

In accordance with still another embodiment of the invention, the polarities of the force curves are reversed with the shorter range, but stronger peak force curve being repulsive and the longer range but weaker peak force curve being attractive. With this arrangement, the two structures attract each other beyond the transition distance and repel each other when within the transition distance, which results in the two magnetic structures achieving a contactless attachment where they are locked in relative position and in relative alignment yet they are separated by the transition distance. This multi-level correlated magnetic system is referred to as a contactless attachment multi-level correlated magnetic system.

In accordance with a further embodiment of the invention, the two magnetic field structures are attached to one or more movement constraining structures. A movement constraining structure may only allow motion to or away from each other where the two magnetic structures are always parallel to each other. A movement constraining structure may not allow twisting (or rotation) of either magnetic field structure. Similarly, a movement constraining structure may not allow sideways motion. Alternatively, one or more such movement constraining structures may have variable states whereby movement of the two structures is constrained in some manner while in a first state but not constrained or constrained differently during another state. For example, a movement constraining structure may not allow rotation of either magnetic structure while in a first state but allow rotation of one or both of the magnetic structures while in another state.

The magnetic sources employed in the invention may be permanent magnetic sources, electromagnets, electro-permanent magnets, or combinations thereof. Magnetic sources may be discrete magnets or may be printed into magnetizable material.

FIG. 1A depicts an oblique view of an exemplary disk shaped correlated magnetic structure 100 having a first side 102 and a side 104.

FIG. 1B depicts a top view of a first exemplary disk shaped correlated magnetic structure 100a having a first region 106 of coded maxels 108 and a second region 110 having a positive polarity. As seen in FIG. 1B, the maxels 108 have a code or pattern of positive and negative polarities, where the code is also exemplary.

FIG. 1C depicts a bottom view of the first exemplary disk shaped correlated magnetic structure 100a of FIG. 1B. As such, the first region 106 has coded maxels 108 having a code that is complementary to the code of the FIG. 1B. By comparing the maxels of FIGS. 1B and 1C it can be seen that the maxels are in seven rows for each structure and each maxel for each row in FIG. 1C has polarity that is opposite a corresponding maxel in the corresponding row of FIG. 1B. One skilled in the art would recognize that when a maxel is magnetized entirely through a magnetizable material that the polarity of the maxel on one side of the material and the opposite polarity on the other side of the material since each maxel is essentially a dipole magnetic source. Similarly, the second regions 110 of the two structures have opposite polarities since they are also a dipole magnetic source.

One skilled in the art will also recognize that the magnetic structure 100a could be produced by magnetizing the maxels in the first region of the positive polarity side of a conventionally magnetized disk magnet in which case magnetization of the positive maxels depicted in FIG. 1B is optional because those areas would already have a positive polarity. Alternatively, the magnetic structure 100b could be produced using non-magnetized magnetizable material by printing the coded maxels in the first region 106 and printing all positive maxels in the second region 110.

FIG. 1D depicts a top view of a second exemplary disk shaped correlated magnetic structure 100b having a first region 106 having the same coded maxel pattern of FIG. 1B and a second region 110 having a negative polarity. As such, the first and second exemplary disk shaped correlated magnetic structure 100a 100b have the same maxel coding in their first regions but the polarities of their second regions are reversed.

One skilled in the art will also recognize that the magnetic structure 100b could be produced by magnetizing the maxels in the first region of the negative polarity side of a conventionally magnetized disk magnet in which case magnetization of the negative maxels depicted in FIG. 1D is optional because those areas would already have a negative polarity. Alternatively, the magnetic structure 100b could be produced using non-magnetized magnetizable material by printing the coded maxels in the first region 106 and printing all negative maxels in the second region 110.

FIG. 1E depicts a bottom view of the second exemplary disk shaped correlated magnetic structure 100b of FIG. 1D.

FIG. 1F depicts a first exemplary repel-snap multi-level correlated magnetic system 112 where the bottom 104a of the first correlated magnetic structure 100a of FIG. 1C faces and is aligned with the top 102b of the second correlated magnetic structure 100b of FIG. 1D such that the two first regions 106 of the two correlated magnetic structures 100a 100b produce an attract force in the near field and the two second regions 110 of the two correlated magnetic structures 100a 100b produce a repel force in the far field.

FIG. 1G depicts a second exemplary repel-snap multi-level correlated magnetic system 114 where the top 102a of the first correlated magnetic structure 100a of FIG. 1B faces and is aligned with the bottom 104b of the second correlated magnetic structure 100b of FIG. 1E such that the two first regions 106 of the two correlated magnetic structures 100a 100b produce an attract force in the near field and the two second regions 108 of the two correlated magnetic structures 100a 100b produce a repel force in the far field.

FIG. 1H depicts the same top view of the first correlated magnetic structure 100a depicted in FIG. 1B and FIG. 1I depicts the same bottom view of the first correlated magnetic structure 100a depicted in FIG. 1C. FIGS. 1H and 1I were provided to make it easier to compare their maxel coding for the first correlated magnetic structure 100a to those of the third correlated magnetic structure 100c of FIGS. 1J and 1K, as described below.

FIG. 1J depicts a top view of a third exemplary disk shaped correlated magnetic structure 100c having a first region 106 having a coded maxel pattern that is anti-complementary to the coded maxel pattern of FIG. 1B and a second region 110 having a negative polarity. The anti-complementary pattern of FIG. 1J is produced by taking each row of the structure 100a of FIG. 1H and reversing the order without changing the polarities of the reversed maxels, where the row "+++−−" is reversed to "−−+++".

FIG. 1K depicts a bottom view of the third exemplary disk shaped correlated magnetic structure 106 of FIG. 1J.

FIG. 1L depicts a first exemplary contactless attachment multi-level correlated magnetic system 116 where the top 102a of the first correlated magnetic structure 100a of FIG. 1H (and FIG. 1B) faces and is aligned with the top 102c of the third correlated magnetic structure 100b of FIG. 1J such that the two first regions 106 of the two correlated magnetic structures 102a 102c produce a repel force in the near field and the two second regions 110 of the two correlated magnetic structures 102a 102c produce an attract force in the far field.

FIG. 1M depicts a second exemplary contactless attachment multi-level correlated magnetic system 118 where the bottom 104a of the first correlated magnetic structure 100a of FIG. 1I (and FIG. 1C) faces and is aligned with the bottom 140c of the third correlated magnetic structure 100c of FIG. 1K such that the two first regions 106 of the two correlated magnetic structures 100a 100c produce a repel force in the near field and the two second regions 110 of the two correlated magnetic structures 100a 100c produce an attract force in the far field.

FIG. 2A depicts a top view of two portions 202a 202b of an exemplary mechanical isolator 200 comprising the first exemplary contactless attachment multi-level correlated magnetic system 116 of FIG. 1L, where the correlated magnetic structures 100a 100b are integrated into triangular fixtures 204a 204b. The triangular fixtures 204a 204b have holes 206a-206c and corresponding pegs 208a-208d intended to constrain movement such that the faces 102a 102c correlated magnetic structures 100a 100b will remain substantially parallel and the coded maxels of each of two portions will properly align with their corresponding anti-complementary maxel (i.e., maxel having same polarity). The pegs 208a-208c extend outward from the surface of the triangular fixture 204b. One skilled in the art will recognize that various alternative maxel coding methods could be employed whereby the pegs 208a-208c and holes 206a-206c of the two triangular fixtures 204a 204b could be aligned in any of three possible alignments and still produce the same repel force magnitude or to produce different repel force magnitudes.

FIG. 2B depicts the alignment of the pegs 206a-206c and holes 208a-208c of the two portions of the mechanical isolator 200 of FIG. 2A. It should be noted that the first portion 202a is flipped upside down and placed on top of the second portion 202b so that the top face 102a of the first correlated magnetic structure 100a faces the top face 102c of the third correlated magnetic structure 100c to produce the first exemplary contactless attachment multi-level correlated magnetic system 116. FIG. 2C depicts the mechanical isolator of FIG. 2A and FIG. 2B after the pegs 208a-208c of the second portion 202b have been aligned and then placed into the holes 206a-206c of the first portion 202a.

FIG. 2D depicts the two portions 202a 202b of the mechanical isolator 200 of FIG. 2A-2C separated by an equilibrium separation distance, where the attract far field force equals the repel near field force. One skilled in the art will recognize that depending on the relative orientation of the mechanical isolator 200 and depending on whether one of the two portions 202a 202b is held fixed relative to the other, the equilibrium separation distance will be impacted by the weight of the first portion 202a (i.e., a fixture and/or any object with which the first magnetic structure is associated) or the weight of the second portion 202b (i.e., a fixture and/or any object with which the second magnetic structure is associated). For example, if the second portion 202b is placed onto a table then the weight of the first portion will cause the equilibrium separation distance to be reduced while if the first portion is attached beneath a surface such as a shelf the weight of the second portion will cause the equilibrium separation distance to be increased. However, if arranged vertically, it may not be necessary to account for the weight of either the first or the second portion.

Figure 2E:
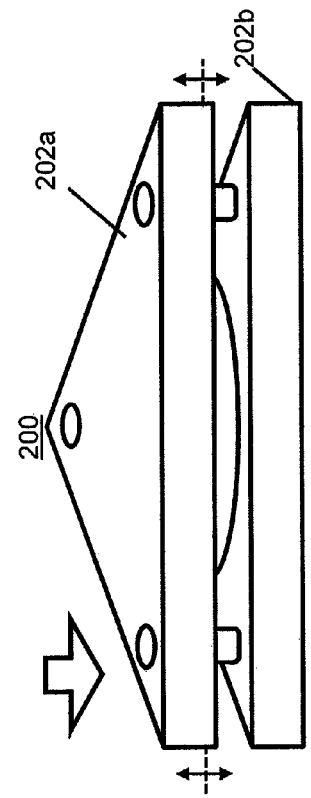
FIG. 2E depicts a first force being applied to the first portion of the exemplary mechanical isolator of FIG. 2D.

FIG. 2E depicts a first force being applied to the first portion 202a of the mechanical isolator 200 of FIG. 2D causing the first portion 202a to move into the near field repel force region as indicated by the first portion 202a being partially beneath the dashed line. When the force is removed the repel force will repel the first portion 202a towards the equilibrium separation distance (i.e., the dashed lines) and the first portion 202a will oscillate about the equilibrium separation distance until the first portion 202a will settle at the equilibrium separation distance.

Figure 2F:
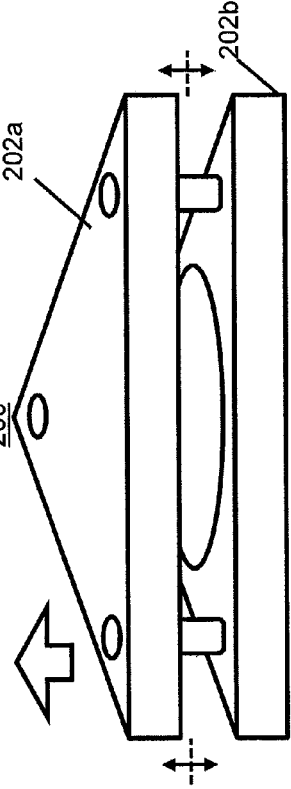
FIG. 2F depicts a second force being applied to the mechanical isolator of FIG. 2D.

FIG. 2F depicts a second force being applied to the first portion 202b of the mechanical isolator 200 of FIG. 2D causing the first portion 202a to move into the far field attract force region as indicated by the first portion 202a being entirely above the dashed lines with some spacing between the first portion 202a and the dashed lines. When the force is removed the attract force will attract the first portion 202a towards the equilibrium separation distance and the first portion 202a will oscillate about the equilibrium separation distance until the first portion 202a will settle at the equilibrium separation distance.

The triangular fixtures described herein are merely exemplary and all sorts of different restraining mechanisms can be employed with the same shape magnetic structures of with magnetic structures of different shapes. For example, one or pegs could be used to maintain alignment of magnetic structures having one or more holes such as ring shaped magnetic structures. A restraining mechanism could merely comprise an outer perimeter that encompasses both structures making up a multi-level magnetic device. Generally, one skilled in the art will recognize that the constraining of the movement of such devices can be done in all sorts of ways. Moreover, pegs or other constraining mechanisms may not be required if the objects are themselves constrained such that magnetic structures attached to the objects maintain their relative alignment. Moreover, various forms of coding may allow one or both magnetic structures to move in some manner (e.g., to rotate) whereby the coding patterns allow such movement. For example, magnetic structures coded with concentric circles might be able to rotate without substantially changing the force curves produced by the magnetic structures.

Figure 3A:
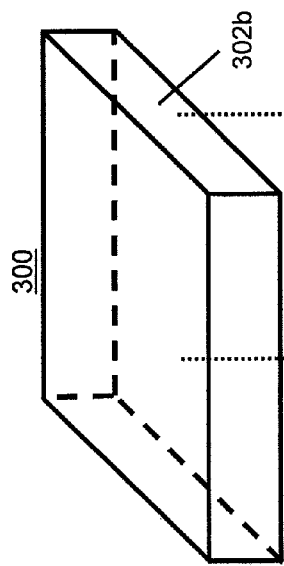
FIGS. 3A and 3B depict an exemplary mechanical isolation system.
Figure 3B:
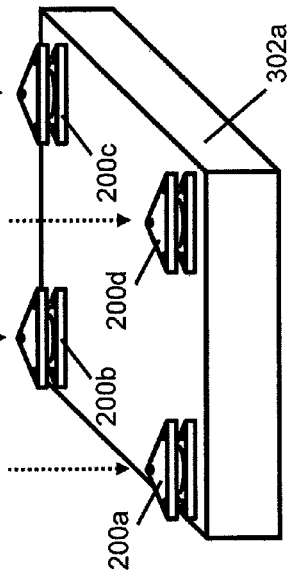

FIGS. 3A and 3B depict an exemplary mechanical isolation system 300 comprising four mechanical isolators 202a-

202d like the one depicted in FIG. 2D being used to control mechanical impedance between a first object 302a and a second object 302b.

Figure 3D:
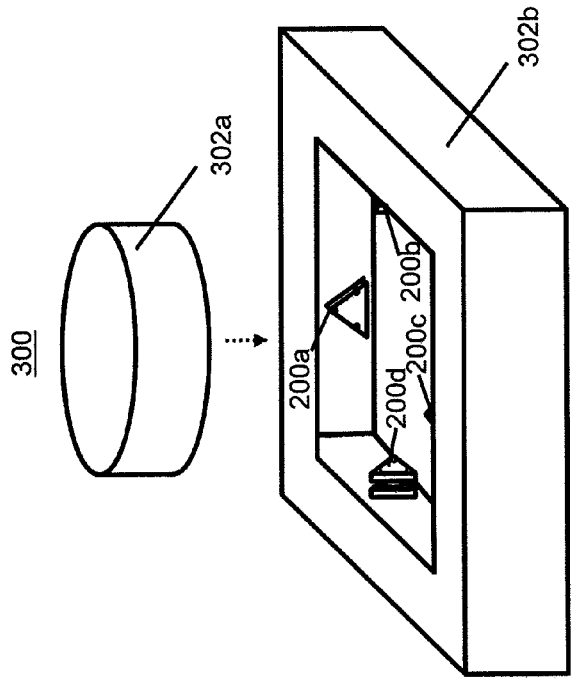
FIGS. 3D and 3E depict yet another exemplary mechanical isolation system.
Figure 3E:
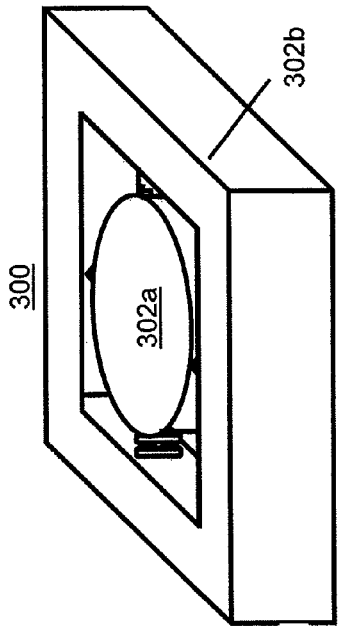
Figure 3C:
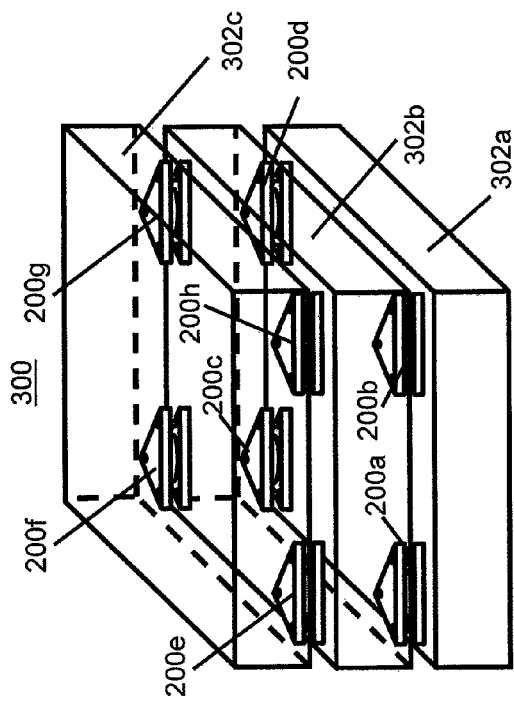
FIG. 3C depicts another exemplary mechanical isolation system.

FIG. 3C depicts another exemplary mechanical isolation system 300 comprising four mechanical isolators 200a-200d like depicted in FIG. 2D being used to control mechanical impedance between a first object 302a and a second object 302d and an additional four mechanical isolators 200e-200h like depicted in FIG. 2D being used to control mechanical impedance between the second object 302b and a third object 302c. As such, the second object 302b has mechanical isolation on two sides.

FIGS. 3D and 3E depict yet another exemplary mechanical isolation system 300 comprising four mechanical isolators like depicted in FIG. 2D being used to control mechanical impedance between a first object 302a and a second object 302b where the second object 302b surrounds the first object 302a. Generally, one skilled in the art will recognize the multiple mechanical isolators can be used to provide isolation between multiple sides of a first object and a second object at least partially surrounding the first object. The shapes of the two objects can be any desired shape as long as multiple mechanical isolators can be used to couple them at multiple points.

Figure 4:
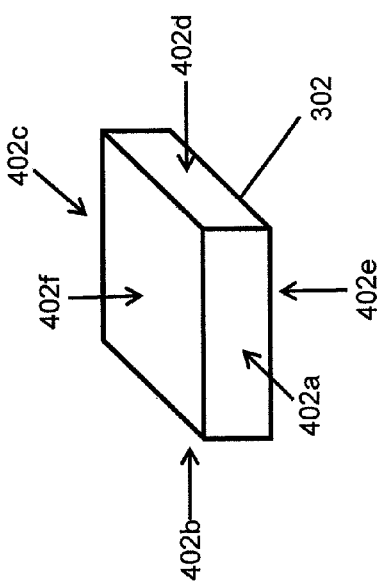
FIG. 4 depicts an exemplary multi-sided first object.

FIG. 4 depicts an exemplary multi-sided first object 302 and arrows 402a-402f indicating that one or more multi-level correlated magnetic systems can be used as mechanical isolators on any one or more of the sides of the first object relative to a second object to control mechanical impedance between the two objects.

Figure 5:
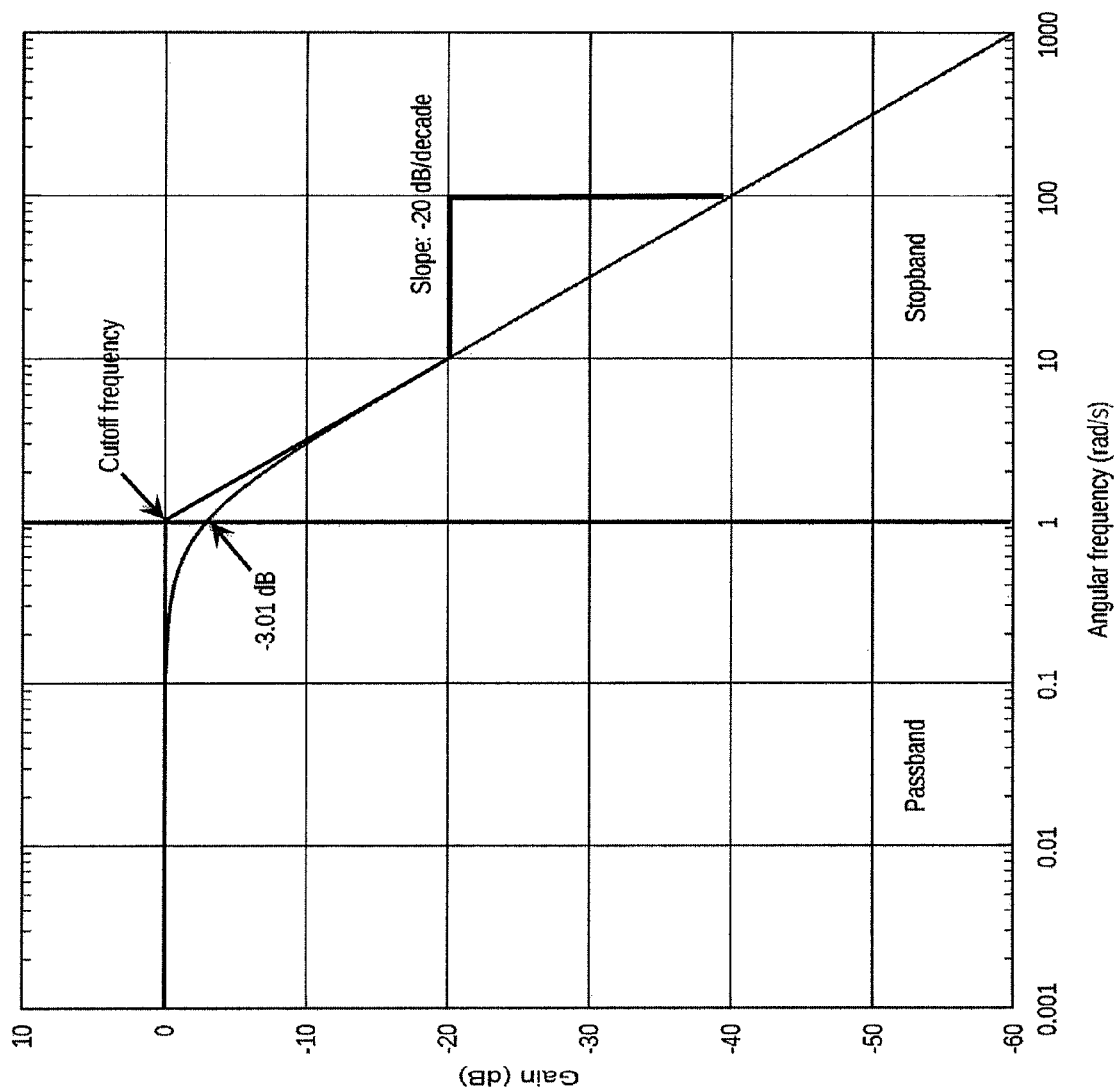
FIG. 5 depicts an exemplary Bode plot of the frequency response of a first order low-pass filter.

FIG. 5 depicts an exemplary Bode plot that represents the frequency response of a low-pass filter. It includes two straight lines that intersect at a cutoff frequency. An ideal low pass filter would completely eliminate all frequencies above the cutoff frequency. Real filters however have a transition region known as the knee at the boundary between the two straight lines.

Figure 6:
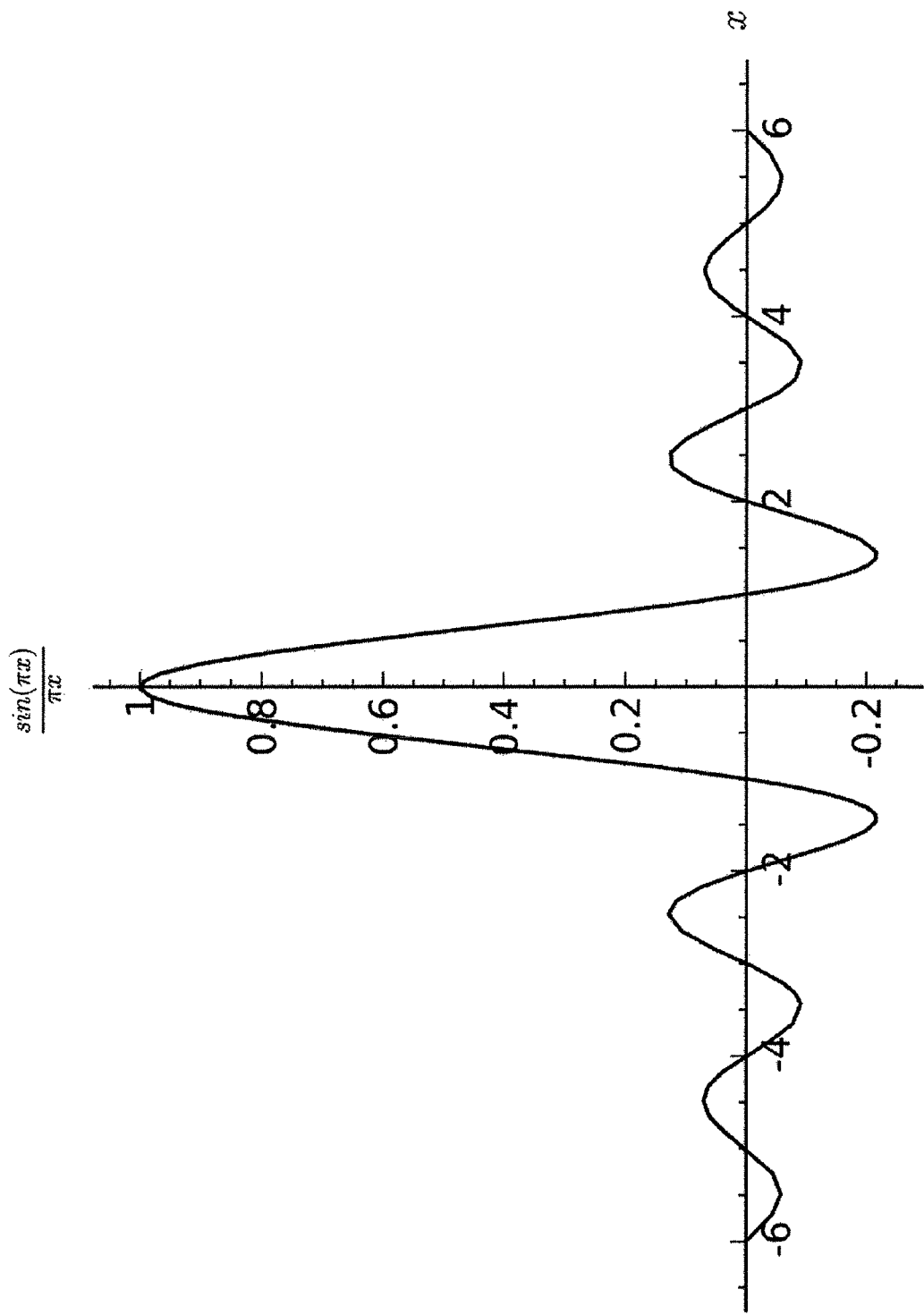
FIG. 6 depicts an exemplary sinc function.
Figure 7A:
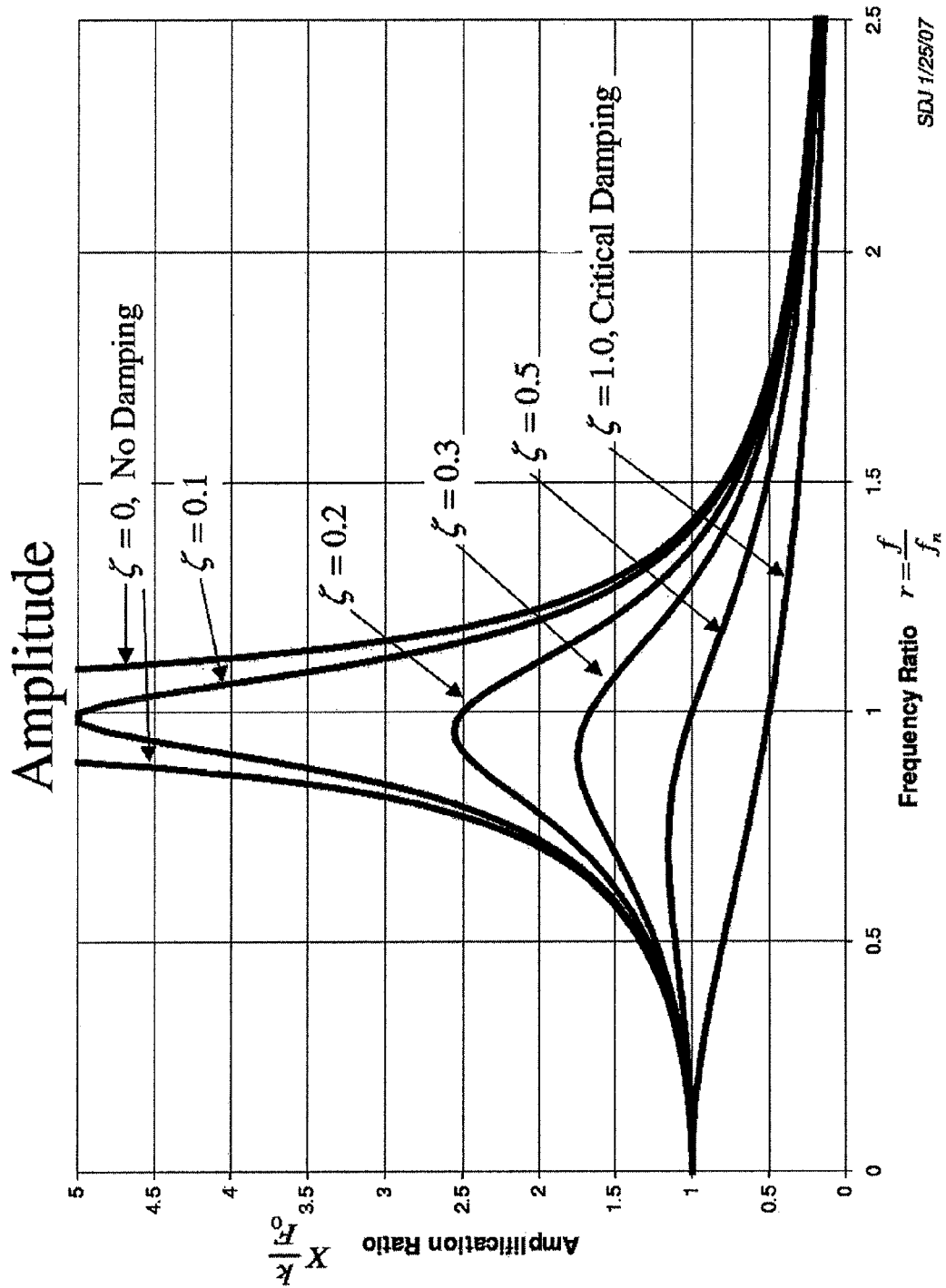
FIGS. 7A and 7B depict exemplary amplitude and phase functions of a mass-spring-damper system.
Figure 7B:
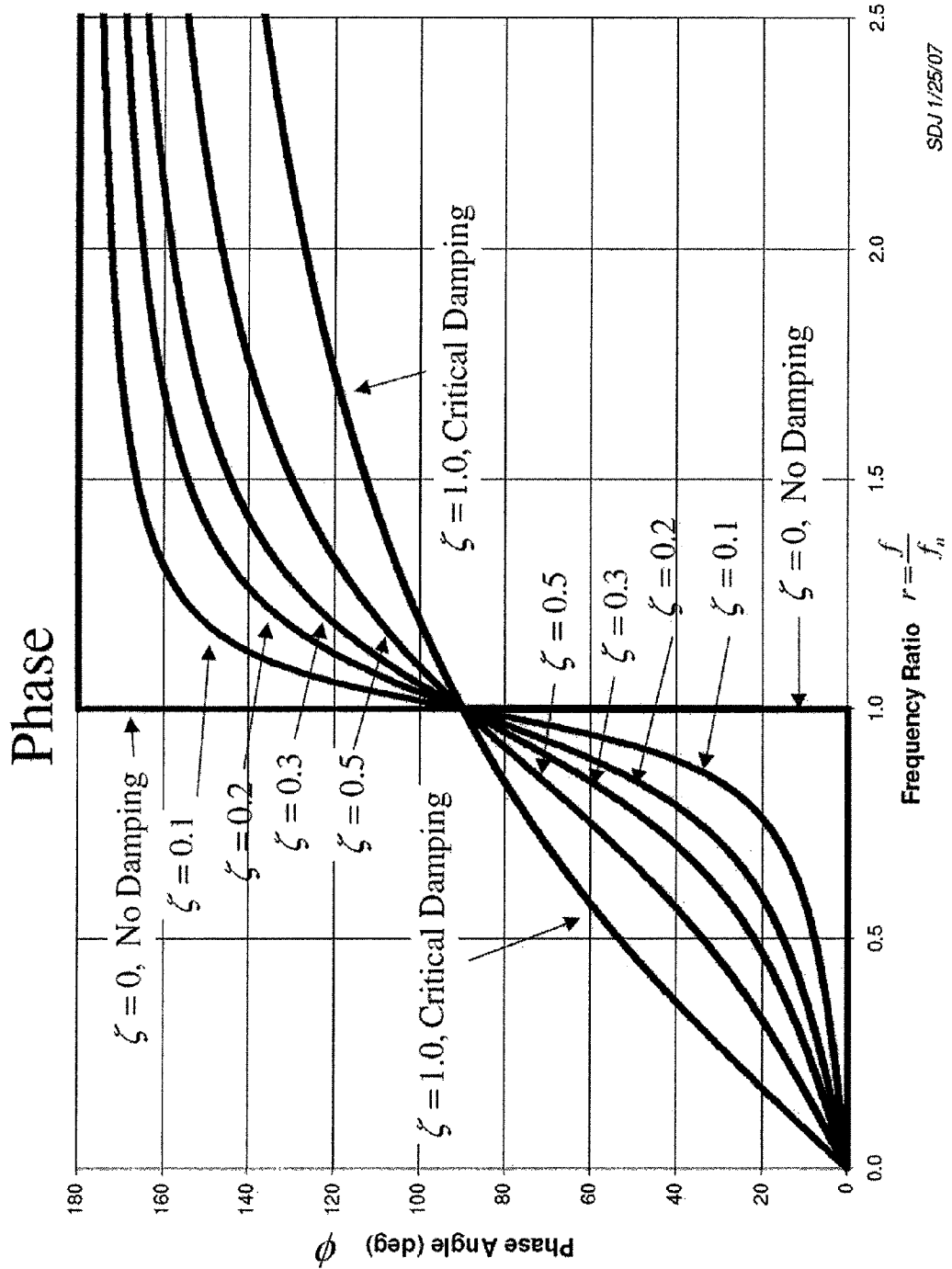
Figure 8:
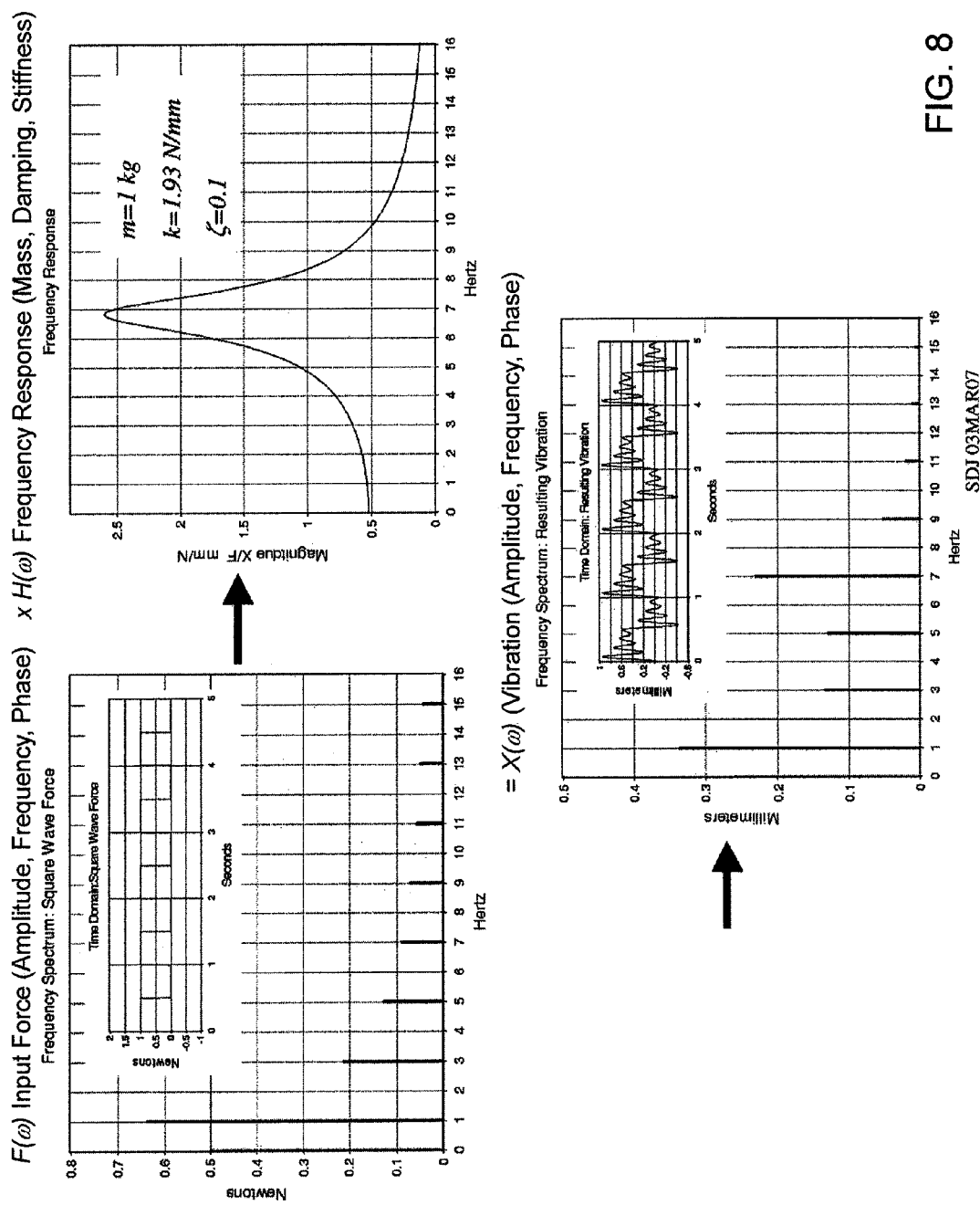
FIG. 8 depicts plots of an input force applied to a frequency response function and the resulting vibration.
Figure 9:
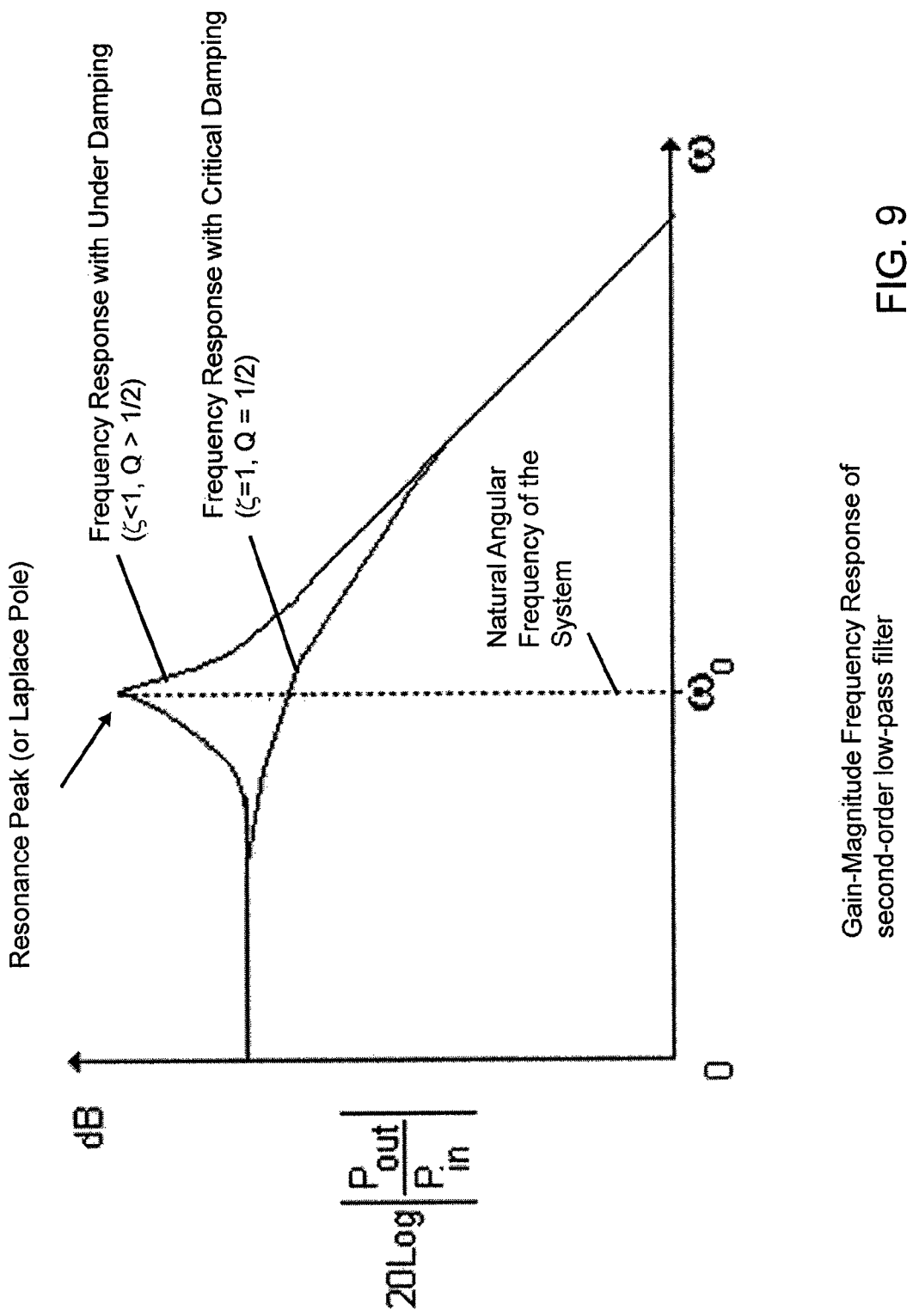
FIG. 9 depicts an exemplary Bode plot of the frequency response of a second order low-pass filter.

FIG. 6 depicts an exemplary sinc function, which is the impulse response of an ideal low-pass filter.

In accordance with the present invention, a mechanical isolator based on a multi-level correlated magnetic system may be configured to function as a first-order low pass filter. Mechanical isolators can also be configured to function as a higher-order low pass filter. Moreover, different mechanical isolators having different cutoff frequencies can be combined. Repel-snap multi-level correlated magnetic systems can also be combined with contactless attachment multi-level correlated magnetics systems, and so forth.

Mechanical (acoustic) isolators in accordance with the invention can be used for all sorts of acoustic devices including speakers and microphones and can be used in all sorts of structures such as buildings, bridges, and the like. Such mechanical isolators can be used whenever there is a desire to isolate vibrations from one object to another such as between a fixed structure and electronic components (e.g., the frame of a plane and its aeronautics equipment). Even motor mounts on a vehicle could benefit from the mechanical isolators described herein.

While particular embodiments of the invention have been described, it will be understood, however, that the invention is not limited thereto, since modifications may be made by those skilled in the art, particularly in light of the foregoing teachings.

The invention claimed is:

1. A multi-level magnetic system for isolation of vibration above a cutoff frequency, comprising:

a first magnetic structure coupled to a first object at a first point; and a second magnetic structure coupled to a second object at a second point, wherein each one of said first magnetic structure and said second magnetic structure have a first portion comprising one or more first magnetic sources configured to produce an attractive force curve when said first and second magnetic structures are in a first relative alignment and each one of the first magnetic structure and the second magnetic structure have a second portion comprising one or more second magnetic sources configured to produce a repelling force curve when said first and second magnetic structures are in said first relative alignment, said attractive force curve and said repelling force curve causing a transition from a repel mode to an attract mode at an equilibrium separation distance between said first magnetic structure and said second magnetic structure where said attractive force equals said repelling force, at least one of said first magnetic structure or said second magnetic structure being configured to oscillate about said equilibrium separation distance in response to a vibration, said oscillation about said equilibrium being filtered to substantially attenuate vibrations above the cutoff frequency.

2. The multi-level magnetic system of claim 1, wherein said vibration comprises a free vibration.

3. The multi-level magnetic system of claim 1, wherein said vibration comprises a forced vibration.

4. The multi-level magnetic system of claim 1, further comprising, a source of motion for said vibration, said source of motion comprising one of a source of seismic motion, reciprocating motion, harmonic motion, linear motion, Brownian motion, circular motion, or rotary motion.

5. The multi-level magnetic system of claim 1, wherein said first portion of said first magnetic structure and said first portion of said second magnetic structure comprises a plurality of complementary coded magnetic sources.

6. The multi-level magnetic system of claim 1, wherein said second portion of said first magnetic structure and said second portion of said second magnetic structure comprises a plurality of anti-complementary coded magnetic sources.

7. The multi-level magnetic system of claim 1, wherein said first portion of said first magnetic structure and said first portion of said second magnetic structure comprises a plurality of complementary coded magnetic sources and said second portion of said first magnetic structure and said second portion of said second magnetic structure comprises a plurality of anti-complementary coded magnetic sources.

8. The multi-level magnetic system of claim 1, wherein said repel mode occurs when said first magnetic structure and said second magnetic structure are separated by a distance less than said equilibrium separation distance and said attract mode occurs when said first magnetic structure and said second magnetic structure are separated by a distance greater than said equilibrium separation distance.

9. The multi-level magnetic system of claim 1, wherein said repel mode occurs when said first magnetic structure and said second magnetic structure are separated by a distance greater than said equilibrium separation distance and said attract mode occurs when said first magnetic structure and said second magnetic structure are separated by a distance less than said equilibrium separation distance.

10. The multi-level magnetic system of claim 1, further comprising:

a movement constraining structure for constraining at least one movement of one of said first magnetic structure of said second magnetic structure.

11. The multi-level magnetic system of claim 10, wherein said movement constraining structure constrains at least one of a rotational motion or a sideways motion.

12. The multi-level magnetic system of claim 10, wherein said movement constraining structure constrains at least one movement while said movement constraining structure is in a first state, wherein said at least one movement is not constrained or said at least one movement is constrained differently while said movement constraining structure is in a second state.

13. The multi-level magnetic system of claim 1, further comprising:
a third magnetic structure coupled to the first object at a third point, and a fourth magnetic structure coupled to the second object at a fourth point.

14. The multi-level magnetic system of claim 13, wherein said third magnetic structure and said fourth magnetic structure substantially attenuate vibrations above a second cutoff frequency.

15. The multi-level magnetic system of claim 1, wherein said first magnetic structure comprises at least one of a permanent magnet, an electromagnet, or an electro-permanent magnet.

16. The multi-level magnetic system of claim 1, wherein at least one of said first magnetic structure of said second magnetic structure comprises magnetic sources printed into magnetizable material.

17. The multi-level magnetic system of claim 1, wherein at least one of said first object or said second object comprises at least one of an acoustic device, a speaker, a microphone, a building, a bridge, a structure, an electronic component, aeronautics equipment, a frame of a plane, a mechanical system, or a fixed structure.

18. The multi-level magnetic system of claim 1, wherein said cutoff frequency is in accordance with at least one of a weight, a mechanical impedance, or a stiffness at one of said first point or said second point.

19. The multi-level magnetic system of claim 1, wherein said first portions of said first and second magnetic structures produce a second attractive force curve when said first and second magnetic structures are in a second relative alignment.

20. The multi-level magnetic system of claim 1, wherein said second portions of said first and said second magnetic structures produce a second repelling force curve when said first and second magnetic structures are in a second relative alignment.

* * * * *